United States Patent [19]

Olich et al.

[11] 4,212,592
[45] Jul. 15, 1980

[54] ELECTROMAGNETIC PUMP FOR MOLTEN METALS

[75] Inventors: Eugene E. Olich, Aptos; Robert B. Weissinger, Santa Clara, both of Calif.

[73] Assignee: General Electric Company, San Jose, Calif.

[21] Appl. No.: 956,282

[22] Filed: Oct. 31, 1978

[51] Int. Cl.² ............................................. H02N 4/20
[52] U.S. Cl. ..................................................... 417/50
[58] Field of Search .................... 417/50; 415/DIG. 1, 415/216, 217

[56] References Cited

U.S. PATENT DOCUMENTS

| | | | |
|---|---|---|---|
| 2,305,500 | 12/1942 | Slayter | 313/231 |
| 2,583,724 | 1/1952 | Broding | 417/50 |
| 2,658,452 | 11/1953 | Donelian | 417/50 |
| 2,786,416 | 3/1957 | Fenemore | 417/50 |
| 2,929,326 | 3/1960 | Ingels | 417/50 |
| 3,115,097 | 12/1963 | Zagar et al. | 415/214 X |
| 3,149,574 | 9/1964 | Mill | 415/214 X |
| 3,155,045 | 11/1964 | Lown et al. | 415/214 X |
| 4,166,714 | 9/1979 | Rienass et al. | 417/50 |

FOREIGN PATENT DOCUMENTS 718429 11/1954 United Kingdom .

Primary Examiner—Carlton R. Croyle
Assistant Examiner—Edward Look
Attorney, Agent, or Firm—Ivor J. James, Jr.; Samuel E. Turner; Sam E. Laub

[57] ABSTRACT

An electromagnetic pump for molten metals wherein a rotating magnetic field causes rotation of the molten metal about the axis of the pump structure. A swirl inducer at the inlet end of the pump has inlet passageways radially spaced from the axis of the pump so as to induce rotational flow in the molten metal passing therethrough.

A dual-conical shaped inductor supported within and axially aligned with a molten metal passageway forms in combination with said passageway a conically tapered flow path for the molten metal.

Angularly oriented flutes are provided in the region of the inductor periphery within the vicinity of the largest diameter portion thereof in order to convert the rotational flow of the molten metal back into axial flow for discharge from the pump.

40 Claims, 9 Drawing Figures

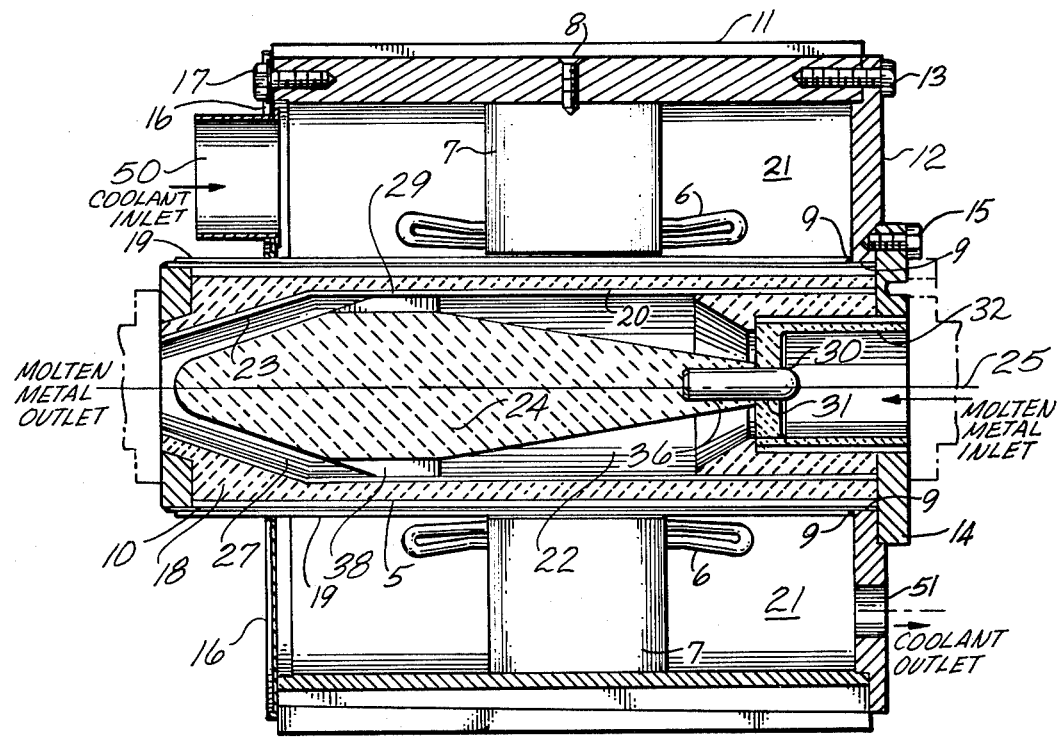
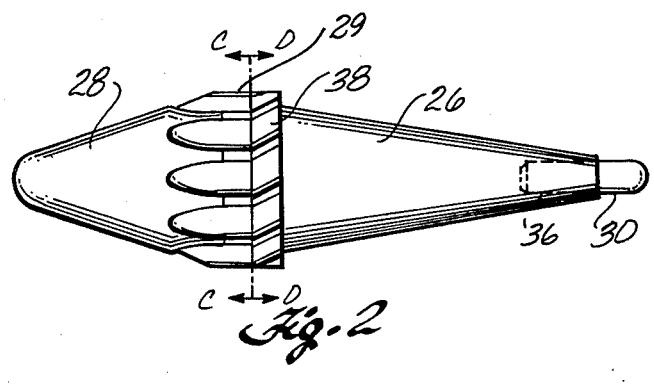

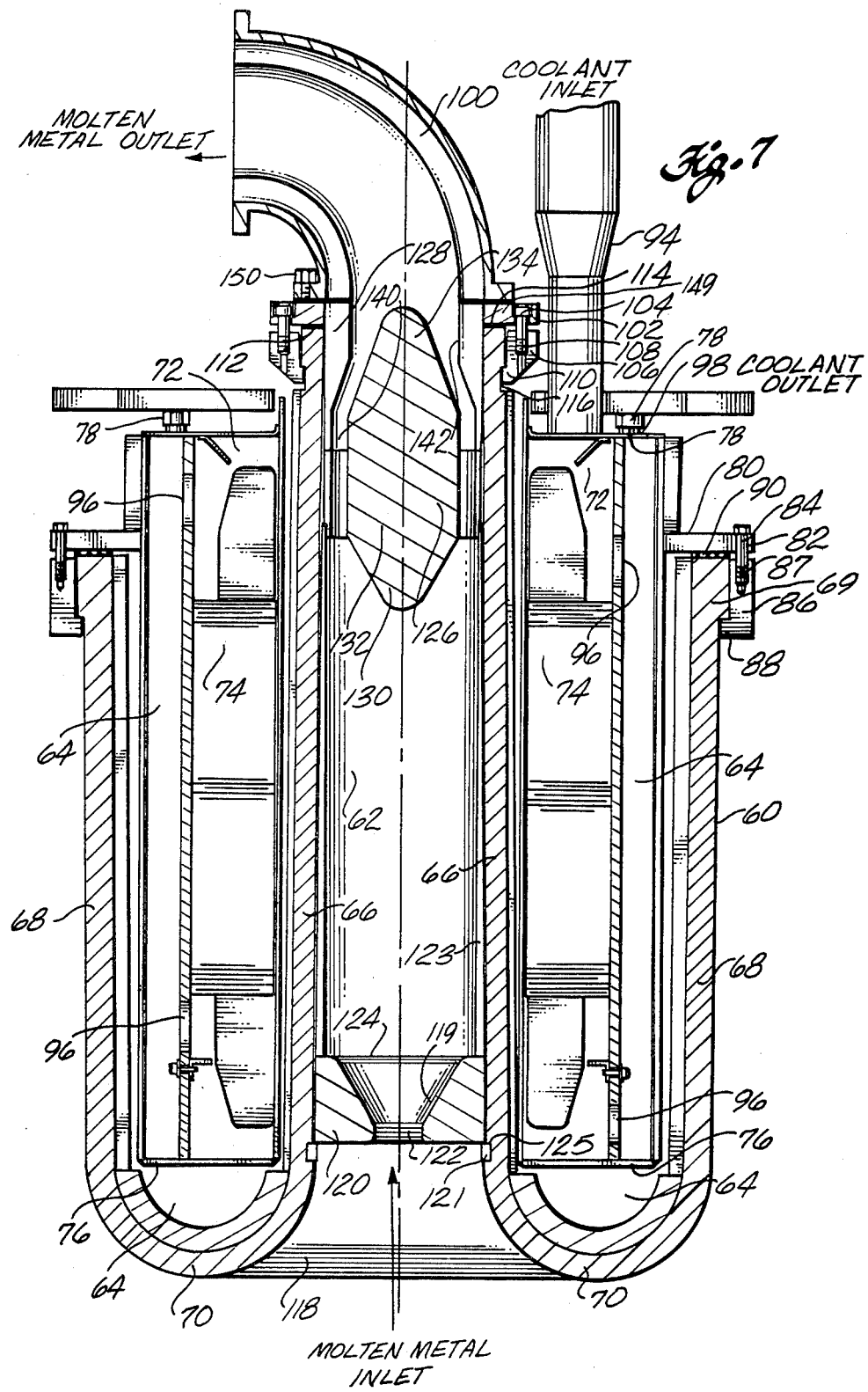

ELECTROMAGNETIC PUMP FOR MOLTEN METALS

BACKGROUND OF THE INVENTION

1. Field of the Invention:

This application relates to electromagnetic pumps for molten metals, and more particularly, to a pump that includes a rotational flow guide or inducer at the inlet and a rotational to axial flow converting inductor located in the region of the pump outlet.

2. Description of the Prior Art:

Electromagnetic pumps are known in the prior art. One class of device is described by Fenemore in U.S. Pat. No. 2,786,416. Operation of the described device relies on the use of a rotating magnetic field which generates currents in fluids within a cylindrical duct. Such currents interact with the magnetic field to produce a forward propelling force in the fluid. Fluid enters the duct by means of inlet ports aligned with the duct axis. A thin-walled cylindrical inner tube, filled with iron powder to concentrate the magnetic lines of flux in the region of the fluid flow, is located within the duct. Pumps of this design have inherent problems in that the pumping efficiency from inlet to output suffers from cavitation losses due to the simultaneous presence of gas and liquid within the duct. Also, since a fluid is introduced axially, an amount of additional energy is required in order to initiate rotational flow in the fluid.

Additionally, the interior shape of the duct and the enclosed cylinder does not efficiently provide for increase in velocity head as the fluid travels through the pump. It is thought that the Fenemore construction results in cavitation losses.

Another problem of the device described is the lack of an efficient means of conversion from velocity head to pressure head at the output of the pump.

Another such pump is described by Ingels in U.S. Pat. No. 2,929,326. Operation of the described pump here again relies upon the use of a rotating magnetic field to generate a forward propelling force on a molten metal that is introduced into the duct of the pump. The described device does not provide for initiating rotational flow in the fluid that enters the pump, nor is there provision for efficient conversion of the velocity head in the molten metal to the pressure head at the exit port of the pump. Thus, significant energy loss is experienced in using pumps of such design.

SUMMARY OF THE INVENTION

The present invention contemplates an electromagnetic pump having a passageway or duct having an inlet and an outlet, means to produce a rotating magnetic field within the duct, a swirl inducer located at the duct inlet to induce rotational flow in the molten metal, as the metal enters the influence of the rotating magnetic field, and a dual conical-shaped inductor located within the duct to convert the rotational flow to axial flow for discharge from the pump. The rotational nature of the flow induced by the swirl inducer minimizes friction losses in the flow as it discharges from the inlet and enters the duct. The rotating magnetic field induces currents to flow within the molten metal. A resulting force propels the molten metal rotationally and increases its head. This head produces a forward propelling force within the metal to propel it through the duct. Consequently, the metal flows helically from inlet to outlet. A plurality of flutes, having a flow receiving end with skewed openings essentially parallel to the direction of the molten metal flow, and a discharge end parallel to the inductor axis, converts rotational to axial flow at the pump outlet.

A divergent first conical portion of the inductor located within the rotational zone reduces fluid cavitation, thus greatly improving pump efficiency.

The shape of the duct wall in the region of the pump outlet port conforms to a convergent second conical portion of the inductor so that an efficient conversion of velocity head to pressure head within the pump is realized with least complexity.

Several layers of insulation line the duct to maintain a minimal heat loss through the pump. Circulating air coolant surrounds the duct so as to prevent thermal damage to a rotating magnetic field producing stator assembly.

The inductor is formed from PUROTAB ceramic, and a layer of silicon carbide lines the duct interior for high heat tolerance and erosion resistance.

An alternate embodiment of the pump includes a crucible having an annular channel about a fluid flow passageway. A rotating magnetic field is generated by a poly-phased winding located within the channel.

An inductor in conjunction with a nozzle, both being positioned at the outlet, convert rotational flow of the molten metal into substantially axial flow. An orifice having an expansion region provides a low energy loss inlet for incoming molten metal. Both the shape of the orifice and rotating magnetic field provide "self-priming" capability generally nonexistent in prior art pumps. Thus, pumping action commences upon energizing of the poly-phased winding.

BRIEF DESCRIPTION OF THE DRAWINGS

FIG. 1 is a cross-sectional view of an electromagnetic pump constructed in accordance with the present invention taken in the plane A—A of FIG. 5.

FIG. 2 is a side view of the inductor of FIG. 1

FIG. 7 is a sectional view of an alternate and presently preferred embodiment of the invention having a crucible.

DETAILED DESCRIPTION

Figure 6:
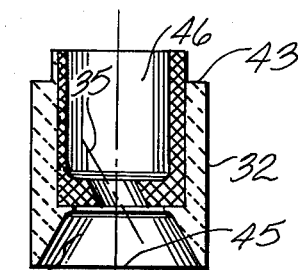
FIG. 6 is a sectional view of the swirl inducer taken in the plane B—B of FIG. 5.

FIG. 1 shows in detail an embodiment of the present invention. The pump includes a cylinder 10, preferably stainless steel, secured within a pump housing 11 by means of welds 9 between the cylinder and pump housing end piece 12. End piece 12 is secured to pump housing 11 by means of bolts 13. The exterior surface of the cylinder 10 is lined with heat insulating material 19, such as CERAFELT (trademark of Johns Mansville Company). CERAFELT is a fiberous ceramic mat made from 47% alumina and 53% silica. Over the interior surface of cylinder 10 is a heat insulating fiber felt mat 5 such as FIBERFRAX (trademark of Carborundum Co.). FIBERFRAX is a mat of ceramic fibers made from essentially equal proportions of alumina and silica. Over the felt mat 5 is a layer of refractory material 18 such as PUROTAB ceramic (trademark of Kaiser Aluminum). PUROTAB ceramic is a castible refractory made from about 94% alumina, 5.4% calcium oxide and 0.6% trace materials. A corrosion resistant layer of silicon carbide 20 uniformly lines the refractory material 18.

Located within silicon carbide liner 20 is a dual-conical shaped inductor 24 and swirl inducer 32. Inductor 24 is maintained in place in liner 20 by means of a slip fit between the liner and the point of maximum diameter 29 of the inductor. A swirl inducer 32 is secured within the cylinder 10 by means of pressure fit between inductor 24 and retaining ring 14. Retaining ring 14 is secured to the end piece 12 by means of bolts 15. Partially surrounding the cylinder 10 is pump cavity 21. Located within the cavity 21 is a poly-phase electrical winding 6 wound about an iron core 7. the iron core 7 is secured to pump housing 11 by means of dowel pin 8. Circulated through cavity 21 is a coolant that enters the cavity through inlet port 50 and exits the cavity through outlet port 51. Any number of available coolants may be used and in a present embodiment air at a temperature of about 25° C. is circulated through cavity 21.

In a typical application, the pump is vertically oriented having the swirl inducer 32 partially submerged within a bath of molten metal to be pumped. Molten metal conduits (not shown) are attached to the inlet and outlet of the pump for inleting and discharging the pumped molten metal into appropriate molten metal reservoirs.

Energizing of the poly-phase electrical windings causes a rotating magnetic field to traverse the interior of the cylinder 10, which serves as a molten metal duct or passageway through the pump. The rotating magnetic field induces currents within the molten metal causing the molten metal within the passageway to rotate. The head of the molten metal increases as a result.

The increase in head produces a differential force exerted on the molten metal, that pumps through the passageway.

The swirl inducer has a plurality of spaced-apart openings so oriented so as to impart an initial rotary motion in the molten metal passing therethrough.

The inductor has a pluraltiy of spaced-apart flutes that are oriented so as to convert the rotational flow of the molten metal entering the flutes to axial flow of the metal exiting the flutes.

The outlet conduit is connected to the pump outlet to receive the molten metal exiting the flutes for transfer to suitable reservoir means.

Referring now in detail to FIG. 2, there is shown in greater detail pump inductor 24. Inductor 24, has a divergent first conically shaped portion 26 and a convergent second conically shaped portion 28 each having a common base and axis. The inductor is located within duct 22 and is axially aligned with stainless steel cylinder 10. Rigid mounting of inductor 24 within duct 22 is accomplished by means of a slip fit contact at the point of maximum diameter 29, of inductor 24, which is the location of the common base of the conical portions with the interior surface of duct 22. Additional mounting support is provided by engagement of the centering tip 30 of inductor 24 with alignment bore 31 in swirl inducer 32.

Inductor 24 fabricated from PUROTAB ceramic is cast in half-sections and fired to form a single unit. Centering tip 30 formed from silicon carbide is located in receiving bore 36 and is coaxial with the axis 25 of inductor 24. The included crown angle of the divergent first conical portion 26 of inductor 24 is about 25°, whereas the included crown angle of the convergent second conical portion 28 is about 35°.

Figure 3:
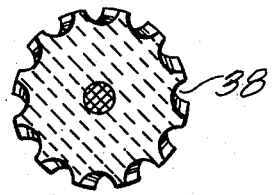
FIG. 3 is a sectional view of the inductor taken in the plane D—D of FIG. 2.
Figure 4:
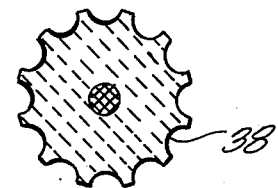
FIG. 4 is a sectional view of the inductor taken in the plane C—C of FIG. 2.

Referring to FIG. 3 and FIG. 4 there is shown in cut-away cross-section inductor 24 along planes D—D and C—C respectively. Located about the region of the common base 29 are a plurality of spaced-apart flutes 38. The flutes, are defined by continuous, generally cylindrical-shaped passageways, having an axis in the region of the inductor's divergent first conical portion 26 at a predetermined angle with the inductor axis 25. While in the region of the convergent second conical portion 28, the axis of the flutes 38 is parallel to the inductor axis 25. The axes of the flutes in the region of the inductor's first conical portion are oriented in a direction to be essentially parallel with the direction of the flow of the incoming molten metal. In a preferred embodiment, the flute axis in the divergent first conical portion 26 is about 30° with respect to the inductor axis 25.

Figure 5:
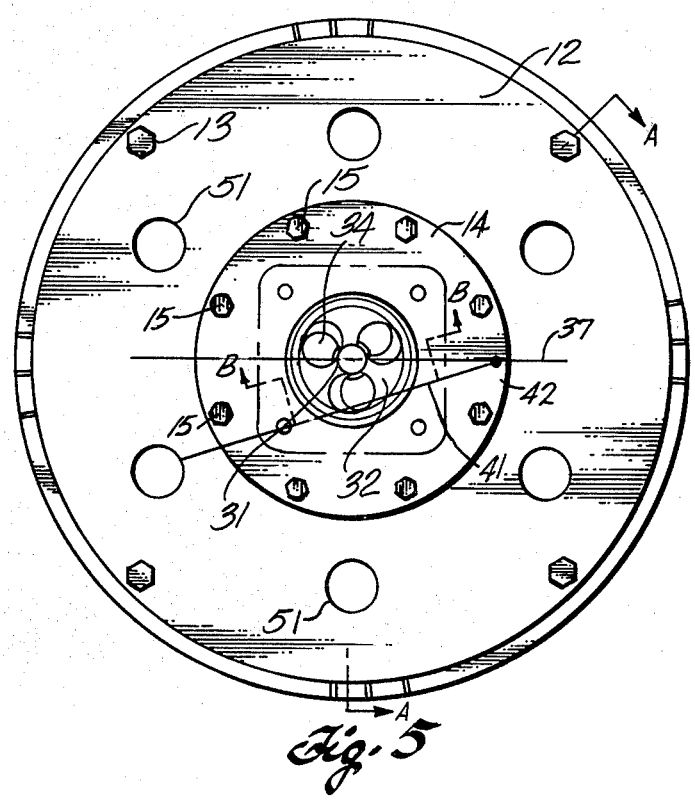
FIG. 5 is an end view of the electromagnetic pump viewed from the inlet.

Referring now to FIG. 5 there is shown in end view swirl inducer 32 located in housing end piece 12. The swirl inducer 32 is maintained within duct 22 by means of locking engagement of annular ring 14 within the swirl inducer shoulder 43. FIG. 6 is a partial cut-away of swirl inducer 32 along plane B—B. Swirl inducer 32, located at the inlet of duct 22, provides mechanical support for inductor 24 and contains a plurality of passageways 34 for the passage of molten metal from the inlet to the duct 22. The passageways 34 are located at the exit side of the swirl inducer inlet chamber 46 and are generally circular and directionally oriented to induce the molten metal flow entering the pump into rotational motion within the region of the divergent first conical portion 26 of inductor 24.

The axis 35 of passageway 34 is skewed with respect to the inductor axis 25 and lies in a plane 41 angularly rotated from the plane defined by center line 37 and inductor axis 25. The axis of rotation 42 of plane 41 lies on center line 37 at a distance in the range of about 75% of the radius of annular ring 14.

Expansion region 44, located at the fluid exit side 45 of swirl inducer 32, is in the nature of an outwardly flared circular bore having a minimum diameter adjacent to passageways 34 and a maximum diameter at the swirl inducer exit 45. The expansion region 44 serves to introduce the molten metal flow into duct 22 with minimum friction losses. At the swirl inducer exit 45, the molten metal is acted upon by a rotating magnetic field (discussed later) which accelerates the metal flow rotationally and axially within the duct 22. The increasing bore diameter defines the expansion region 44 surface taper with respect to the inductor axis. For the preferred embodiment, optimum expansion region characteristics are realized with a taper of about 30°.

The passageways 34 are so oriented to initiate rotational flow of the molten metal as it enters the expansion region 44. Although the rotational direction is arbitrarily selected, for the presently preferred embodiment, the rotational orientation is counterclockwise when viewed along the axis 25 from the inlet side of the pump.

With such a rotational orientation, the direction of the rotating magnetic field and inductor flutes are correspondingly oriented for counterclockwise flow.

Within the housing 11 is wrapped electrical conducting wire 6 adapted to receive poly-phased AC power. The energizing current in the windings generates a rotating magnetic field in the region of the divergent first conical portion of inductor 24. In the present preferred embodiment, a standard three-phase induction motor stator is used to provide the rotating magnetic field. The field induces currents to flow in the molten metal which interacts with the rotating magnetic field to produce a rotation of metal within the pump duct 22 and about inductor 24. A differential pressure, resulting from the rotation of the molten metal, produces a force on the metal to propel it through the pump. As the molten metal flows along and about the divergent first conical portion 26 of inductor 24, both its tangential and axial velocity components increase until the metal reaches the common base 29. At such time the molten metal enters the flutes 38 wherein the rotational flow of the molten metal is converted into axial flow which then converges within the region defined by the converging second conical portion 28 and the matching duct surface 23.

The axis of the flutes, as previously described, is skewed in the region of the diverging first conical portion 26 with respect to inductor axis 25 in order to efficiently receive the entering molten metal and convert the metal's tangential velocity to axial velocity. The axis of the continuous flutes 38 in the region of the converging second conical portion 28 is parallel to inductor axis 25 so that the metal flow is essentially axial between the inductor portion 28 and duct surface 23. The sloping interior wall surface 23 of duct 22 conforms to the conical-shaped surface of inductor portion 28 thus forming circular channel 27 for essentially the length of said portion 28. The channel 27 serves to maintain molten metal flow velocity at the pump outlet essentially at the same rate as the molten metal exit velocity at the flutes 34.

The conical divergent first portion 26 of inductor 24 is such that the volume of the duct 22 within which the molten metal flow diminishes in the region between the swirl inducer exit 45 and the common base 29. Thus, at the common base 29, the rotational component of velocity of the molten metal is at its highest level or at maximum velocity head. The rotational component of the velocity of the molten metal entering the flutes, as previously discussed, is converted to axial thus converting the velocity head at common base 29 to pressure head at the discharge point of the flutes.

The region between the pump outlet and the common base 29 is relatively free of contact with the rotating magnetic field so that no influence is exerted upon the molten metal by the field. The separation between the inductor surface and duct wall 22 in the region of inductor portion 28 remains constant so as to maintain the velocity of the molten metal therein constant resulting in efficient conversion of velocity head to pressure head. P In an alternate embodiment, swirl inducer 32 is merely an inlet port having an opening for entry of the molten metal into the duct region. Thus, the rotational qualities of the flow are imparted as a result solely of exposure of the flow to the rotating magnetic field.

Referring now to FIG. 7, there is shown in detail a cross-sectional view of an alternate embodiment of the present invention. The pump is in the general shape of a crucible formed from a refractory, preferably fused silica. The crucible 60 has a generally cylindrical molten metal passageway 62 surrounded by annular channel 64. The channel 64 has an inner wall 66, an outer wall 68, a closed end 70 and an open end 72. The closed end 70 prevents intrusion of molten metal into the channel when the pump is immersed into a bath from which molten metal is pumped. The inner wall surface 66 defines passageway 62 through which the metal being pumped flows. Located within the channel is a polyphased AC winding assembly 74 secured to a winding supporting bracket 76 by means of fastening bolts 78. The supporting bracket 76 is secured to the crucible by means of locking engagement of each of ring flange 80 to an outer wall annular boss 69.

The ring flange 80, which extends beyond the outer surface of the crucible 60, has a bore 82 therethrough to receive fastening bolt 84. An L-shaped bracket 86 has at one end a taped bore 87, and at its other end, an extension portion 88 adapted to engage in abutting fashion the outer wall boss 69. Annular washer 90 is located between ring flange 80 and annular boss 69. Locking force exerted by fastening bolt 84 engaged in taped bore 87 serves to both secure the support bracket 76 to the crucible and to squeeze gasket 90, thus forming a seal between annular boss 92 and ring flange 80.

Connected to the support bracket 76 is coolant inlet conduit 94. Coolant introduced by means of conduit 94 into the annular channel flows through openings 96 and is discharged from the pump through coolant outlet 98.

Molten metal discharge conduit 100 is secured to annular ring 149 by means of bolts 150. The annular ring 149 is secured to the crucible inner wall 66 by means of fastening bolts 104 and split flange 106. The flange portion 102 of annular ring 149 has a bore therethrough to receive locking bolt 104. Split flange 106 has a taped bore 108 and a raised edge 110. Located between the discharge conduit 100 and the passageway edge 112 is sealing gasket 114. About the outer circumference of inner wall 66 is an annular groove 116 adapted to receive in abutting fashion the raised edge 110 of split flange 106 such that clamping force exerted by fastening bolt 104 engaged in taped bore 108 squeezes sealing gasket 114 and secures the discharge conduit 100 to the crucible 60 in a leak-proof manner.

Located at the molten metal input end 118 of the pump is orifice 120. The annular orifice 120, formed preferably from grade "A" lava or silicon carbide, extends across the diameter of the passageway 62 and has an inlet side bore 122 and a discharge side 124. Orifice 120 is secured into position by means of pressure fit between annular ring 121 and passageway liner 123. Locking ring 121 is seated in annular groove 125 located at the inlet and of the passageway walls 66. The inlet side bore 122 is essentially cylindrical extending into the orifice with a constant diameter to about 25% of the bore length, said bore continuing in an outwardly flared manner to a point of maximum diameter at the discharge side 124. In the preferred embodiment, the diameter of the bore at the inlet side is about 1.5 inches, and the slope of the outwardly flared bore is about 30°.

The area defined by the outwardly flared bore forms an expansion region 119 with the property of providing minimum energy loss due to friction and shear losses and minimum pressure drop to the molten metal flowing therethrough.

Additionally, the discharge side 124 of orifice 120 opens gradually into the molten metal passageway 62 thereby minimizing fluid flow energy losses due to friction and turbulent flow effects.

Liner 123, formed from silicon carbide, is in the general shape of a cylindrical sleeve that is insertable in and removable from passageway 62. The liner 123 is maintained in place by means of a pressure fit between orifice 120 and inductor 126. The liner 123, which is relatively impervious to the corrosive effects of molten metals, is used in order to prevent damage from contact of such metals with the crucible wall 66.

The liner 123, due to its ease of removability and replacement, increases the lifetime of the pump, since the corrosive effects of the metals, especially aluminum, are thus easily remedied.

Figure 8:
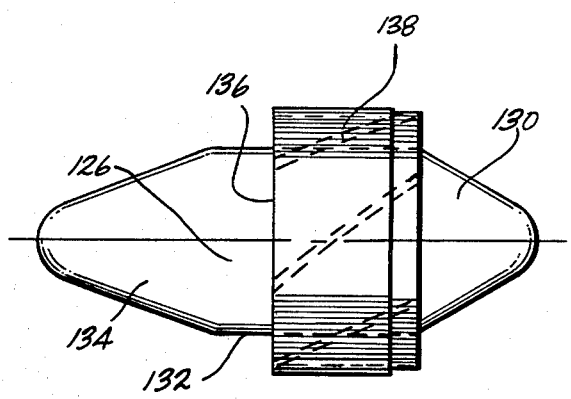
FIG. 8 is a view of an alternate embodiment of an inductor.
Figure 9:
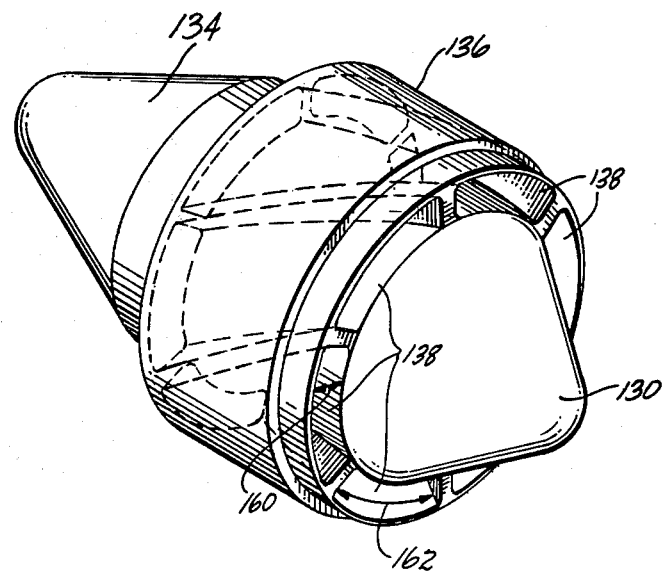
FIG. 9 is a perspective view showing the helical flutes of the inductor of FIG. 8.

Inductor 126 (FIGS. 8 and 9), formed from grade "A" lava or silicon carbide, is secured within passageway 62 by means of an abutting pressure fit between liner 123 and nozzle 128. The inductor 126, which has a divergent first conical portion 130, a cylindrical center portion 132 and a convergent second conical portion 134, is axially aligned with the passageway 62. The included crown angle of the divergent first conical portion 130 is about 60° whereas, the included crown angle of the convergent second conical portion 134 is about 40°. Extending from and circumscribing the surface of the center portion 132 is annular ring 136. Located within and axially spanning the annular ring 136 are a plurality of spaced-apart flutes 138 (see FIG. 9). The flutes 138 located below the periphery of the annular ring 136 are defined by continuous helical channels that provide for passage therethrough of molten metal from passageway 62 into the discharge conduit 100.

In a specific construction of the presently preferred embodiment, the inductor 126 has six equally spaced, left-handed helical flutes (viewed along axial flow direction of the metal). The cross-section of each flute is generally rectangular, and it has a lead of about 18 inches in one revolution. The height 160 of the flutes is about ½ inch, and the width 162 is about 2 inches.

At the point of entry into the flutes, the molten metal is moving in an essentially rotating manner. As the metal proceeds through the helical flutes, its rotational flow is modified to conform to the contour of the flutes. Thus, the rotational nature of the molten metal flow has been altered to include an axial component which imparts a forward motion to the flow, such forward motion carrying the molten metal flow up and through discharge conduit 100.

In an alternate embodiment, the inductor has a plurality of flutes essentially as shown and described in FIG. 2. The flutes provide almost total axial flow of the molten metal as it discharges from the inductor. Such an inductor may be used for discharge of the flow into discharge conduit 100 in a manner as previously described.

Nozzle 128, formed preferably from grade "A" lava or silicon carbide, is insertable in and removable from the passageway 62. The nozzle 128 is maintained in place by means of an abutting pressure fit between the annular ring 136 of inductor 126 and discharge conduit 100. Upon tightening of bolts 150, the discharge conduit 100, nozzle 128, inductor 126, liner 123, orifice 120 and locking ring 121 form one integral sealed unit for the passage of molten metal therethrough.

The nozzle 128 has a generally circular bore of constant diameter at its inlet side 140, and at its outlet side 142. The center portion bore of nozzle 128 is tapered to conform to the shape of the convergent second conical portion 134 of inductor 126. The thus formed channel, between inductor 126 and nozzle 128, minimizes fluid flow friction losses as well as contraction losses.

Operation of the pump is based upon the interaction of a rotating AC magnetic field generated by the polyphased winding 74, and the molten metal to be pumped. In a typical application, the pump is immersed in molten metal at its inlet side to about ⅓ of its length, thus the molten metal initially lies above the orifice 120 and within the passageway 62. Application of the polyphased AC power to the windings, preferably standard 440 volt 60 hertz power, causes a rotating magnetic field to pass through passageway 62. The rotating magnetic field induces currents within the molten metal that generates a magnetic field that in turn interacts with the rotating magnetic field to cause the metal within passageway 62 to rotate. Typically, devices of the prior art require priming during this initial start-up. However, the device herein described is "self-priming" so that rotation of the molten metal commences upon application of the polyphased power.

The molten metal is rotationally accelerated to a tangential velocity of about 40 feet per second. A velocity head is created in the rotationally moving molten metal, and a free-surface vortex is created having an apex in the vicinity of the orifice 120. The pressure head in the rotating molten metal is converted to velocity head, thus, a differential pressure is created between the orifice inlet 118 and the vortex, said pressure difference being in such a direction as to cause the metal to be pumped through the passageway 62. Upon contact with the inductor 126, the molten metal enters the helical-shaped flutes and the flow is converted from rotational to substantially axial for movement through discharge conduit 100.

While the basic principle of this invention has been herein illustrated along with two embodiments, it will be appreciated by those skilled in the art that variations in the disclosed arrangement, both as to its details and as to the organization of such details, may be made without departing from the spirit and scope thereof. Accordingly, it is intended that the foregoing disclosure and the showings made in the drawings will be considered only as illustrative of the principles of the invention and not construed in a limiting sense.

What is claimed is:

1. An electromagnetic pump for molten metals comprising:
   a housing;
   a duct through the housing having an inlet and an outlet;
   means for introducing molten metal into the inlet of the duct;
   means for producing a magnetic field within the duct to produce rotational flow of the molten metal within the duct;
   an inductor having an exterior defined by a divergent first conical portion and a convergent second conical portion, said portions having facing bases and a common axis,
   the divergent first conical portion having its crown facing the inlet, and the convergent second conical portion having its crown facing the outlet;
   means securing the inductor to the duct; and
   a plurality of flutes that span the annulus between the interior wall of the duct and exterior of the inductor in the region of the bases said flutes converting at least a substantial portion of the rotational flow of the molten metal to axial flow.

2. The pump according to claim 1 wherein the securing means secures the inductor to the duct by attaching the base of the first conical portion to the interior surface of the duct.

3. The pump according to claim 2 wherein the securing means secures the inductor to the duct by the inductor engaging the duct with a slip fit.

4. The pump according to claim 3 wherein the means for producing the rotating magnetic field further comprises:
A.C. poly-phase electrical winding means coupled with the duct to produce, when energized, a rotating magnetic field; and
means for energizing the winding means with polyphase electrical power thereby producing the rotating magnetic field within the duct, said magnetic field generating currents within the molten metal, said currents interacting with the magnetic field thereby producing a force within the metal to propel it through the duct.

5. The pump according to claim 4 wherein the flutes are defined by continuous flow channels between the first and second conical portions of the inductor, said flutes converting rotational flow of the molten metal in the region of the divergent first conical portion to axial flow in the region of the convergent second conical portion.

6. The pump according to claim 5 wherein the continuous flow channel is adapted to receive in the region of the divergent first conical portion the rotational flow of the molten metal and to discharge in axial flow direction, said molten metal into the region of the convergent second conical portion.

7. The pump according to claim 6 wherein the continuous flow channel is at a predetermined angle with respect to the inductor axis in the region of the divergent first conical portion and is substantially parallel to the inductor axis in the region of the convergent second conical portion.

8. The pump according to claim 7 wherein the predetermined angle is about 30°.

9. The pump according to claim 8 wherein the duct includes:
a cylinder;
a first layer of a heat insulating material uniformly disposed on the interior surface of the cylinder;
a second layer of a refractory ceramic material disposed on the insulating material; and
a third layer of a corrosion resistant ceramic material disposed on the refractory layer.

10. The pump according to claim 9 wherein the cylinder is formed from stainless steel.

11. The pump according to claim 10 wherein the heat insulating material is an insulating fiber felt mat made from essentially equal proportions of alumina and silica, the refractory is castible and contains about 94% alumina and 6% calcium oxide, and the third layer is silicon carbide.

12. The pump according to claim 11 wherein the inductor is fabricated of a castible refractory containing about 94% alumina and about 6% calcium oxide.

13. The pump according to claim 12 wherein the means for introducing molten metal into the duct further comprises a swirl inducer having an inlet chamber to receive molten metal from a source thereof, an expansion region to discharge the molten metal into the duct, at least one passageway connecting the chamber and the expansion region for passage of molten metal therebetween.

14. The pump according to claim 13 wherein the expansion region is an increasing diameter bore having a smallest diameter in the vicinity of the passageway, and a surface taper of the expansion region bore is at a predetermined angle with the inductor axis.

15. The pump according to claim 14 wherein the predetermined angle of the surface taper is about 30°.

16. The pump according to claim 15 wherein the swirl inducer has a plurality of passageways located at the inlet to convert the flow of incoming molten metal to rotational flow.

17. The pump according to claim 16 wherein the passageways are directionally oriented to initiate rotational flow of the molten metal.

18. The pump according to claim 17 wherein the passageways are circular having an axis at a predetermined angle with respect to the axis of the inductor.

19. The pump according to claim 18 wherein the predetermined angle is about 30°.

20. The pump according to claim 1 further comprising means for cooling the duct.

21. The pump according to claim 20 wherein the cooling means further comprises a cavity in the housing, said cavity extending about the duct and having a coolant inlet and a coolant outlet.

22. The pump according to claim 21 wherein the coolant is air at a temperature of about 25° C.

23. An electromagnetic pump for metals in which molten metal is pumped comprising:
a crucible having a fluid flow passageway, said passageway having an inlet and an outlet;
an annular channel surrounding the fluid flow passageway, the channel having a closed end at the inlet for preventing intrusion of molten metal into the channel;
means for introducing molten metal into the inlet;
means located within the channel for producing a rotating magnetic field within the passageway, said magnetic field causing rotational flow of molten metal within the passageway; and
an inductor located at the outlet for converting rotational flow of the molten metal to substantially axial flow.

24. The pump according to claim 23 wherein the means for producing the rotating magnetic field further comprises:
AC poly-phased electrical winding means located within the channel to produce when energized a rotating magnetic field within the passageway; and
means for energizing the winding means with polyphased electrical power thereby producing the rotating magnetic field within the passageway, said magnetic field generating currents within the molten metal, said currents interacting with the magnetic field thereby producing rotational flow of the metal within the passageway.

25. The pump according to claim 24 wherein the inductor further comprising:
a divergent first conical portion having its crown oriented in the direction towards the inlet;
a center cylindrical portion;
a convergent second conical portion having its crown at the outlet;
an annular ring about the cylindrical portion; and a plurality of helical flutes within and axially spanning the annular ring for converting rotational flow of the molten metal entering the flutes to substantially axial flow as it discharges from the flutes.

26. The pump according to claim 25 wherein the helical flutes have a lead of about 18 inches per revolution.

27. The pump according to claim 26 wherein the means for introducing molten metal into the inlet is an orifice, said orifice having a region of constant diameter bore at the inlet followed by a region of expanding diameter bore for discharge of the molten metal into the passageway.

28. The pump according to claim 27 further comprising a thin corrosion resisting lining in the form of a removable sleeve that conforms to the contour of the passageway, said sleeve extending through the passageway from the orifice to the inductor.

29. The pump according to claim 28 wherein the lining is fabricated from aluminum oxide.

30. The pump according to claim 28 wherein the lining is formed from silicon carbide.

31. The pump according to claim 30 having a nozzle located around the center cylindrical portion and convergent second conical portion of the inductor, said nozzle conforming to the contour of the convergent second conical portion forming a channel therebetween, said channel minimizing fluid flow losses in the region of the pump outlet as the molten metal is discharged from the pump.

32. The pump according to claim 31 wherein the nozzle is formed from silicon carbide.

33. The pump according to claim 31 wherein the nozzle is formed from aluminum oxide.

34. The pump according to claim 33 further comprising means for cooling the crucible.

35. The pump according to claim 34 wherein the means for cooling the crucible further comprises:

means for introducing a circulating coolant into the channel; and means to discharge the coolant from the channel.

36. The pump according to claim 35 wherein the inductor is defined by a divergent first conical portion and a convergent second conical portion, said portions having facing bases and a common axis, the divergent first conical portion having its crown in the direction of the inlet and its base contacting the interior surface of the passageway at a point intermediate along the length of the passageway;

the convergent second conical portion having its crown at the exit and its base at the point of contact of the divergent first conical portion with the passageway; and a plurality of flutes disposed about the circumference of the inductor at the point of contact of the inductor with the passageway, said flutes converting the rotational flow of the molten metal to axial flow.

37. The pump according to claim 36 wherein the flutes are defined by continuous flow channels between the first and second conical portions of the inductor, said flutes converting rotational flow of the molten metal in the region of the divergent first conical portion to axial flow in the region of the convergent second conical portion.

38. The pump according to claim 37 wherein the continuous flow channel is adapted to receive in the region of the divergent first conical portion the rotational flow of the molten metal and to discharge in axial flow direction said molten metal into the region of the convergent second conical portion.

39. The pump according to claim 38 wherein the continuous flow channel is at a predetermined angle with respect to the inductor axis in the region of the divergent first conical portion and is substantially parallel to the inductor axis in the region of the convergent second conical portion.

40. The pump according to claim 38 wherein the predetermined angle is about 30°.

* * * * *